Figure 1:
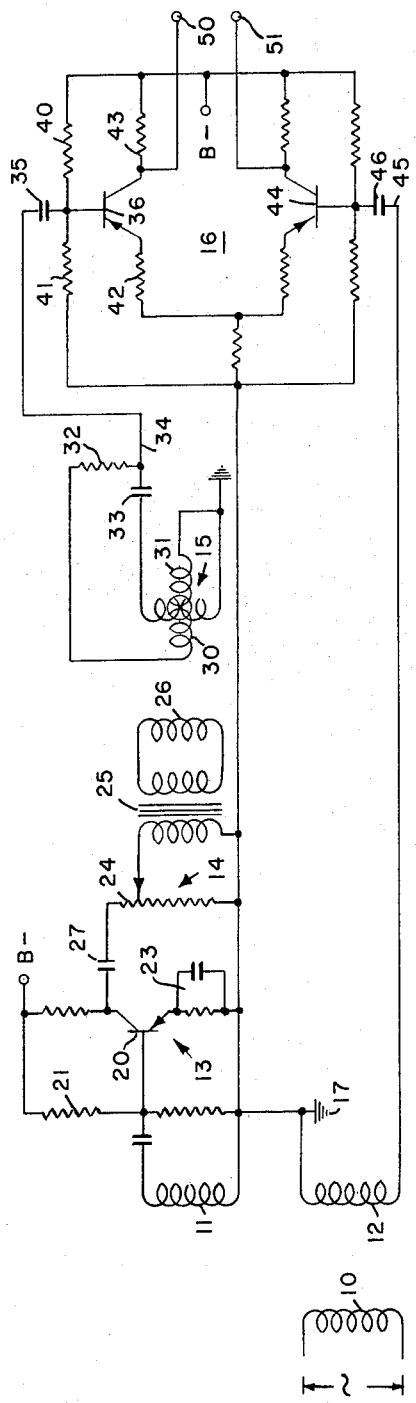

INVENTOR
T. R. SCHMIDT
BY Theodore E. Bichel
HIS ATTORNEY

United States Patent Office 3,286,168
Patented Nov. 15, 1966

3,286,168
APPARATUS FOR ADJUSTING THE AMPLITUDE AND PHASE OF PICKUP COILS OF EDDY CURRENT INSTRUMENTS
Thomas R. Schmidt, Lafayette, Calif., assignor to Shell Oil Company, New York, N.Y., a corporation of Delaware
Filed Dec. 18, 1962, Ser. No. 245,588
3 Claims. (Cl. 324—40)

This invention pertains to eddy current instruments and more particularly to a method for adjusting the sensitivity of an eddy current instrument that uses a differential coil arrangement for the pickup coil.

In a copending application of T. R. Schmidt entitled, "Pipe Inspection Device," Serial No. 778,801, filed December 8, 1958, now Patent No. 3,060,377 there is described and claimed an eddy current type instrument for detecting flaws and other anomalies in tubular goods and the like. The instrument described utilizes a single source coil and a pickup coil formed by a pair of coils that are coupled in electrical opposition. This type of system requires closely balanced coils with respect to phase and amplitude of the signals that are induced in the pair of coils that form the pickup coil. In the copending application, a method of balancing the coils by removing the turns is described. While this method is practical, it has serious limitations. First, once the degree of balance is determined when the coils are constructed it cannot be changed later when the coils are assembled in the instrument. Secondly, all instruments have slightly different sensitivities to flaws as a result of the difficulty of keeping materials and construction practices uniform from instrument to instrument and thus it is impossible to trim different instruments to give substantially the same flaw sensitivity.

In addition, by having fixed sensitivity, it is impossible to adjust the sensitivity for various tubular members. It is well known that some tubular members produce inherently noisier signals than others and in this instance it would be desirable to reduce the sensitivity of the instrument to obtain a more readable record. Conversely when a tubular member produces a quieter record it would be desirable to increase the sensitivity of the instrument.

Finally, when one removes turns from one coil to balance the two coils, in addition to changing the phase and amplitude, this method also changes the inductance and resistance of the coil. To achieve a satisfactory balance between the two coils it is necessary to remove turns while plotting the amplitude versus phase angle of the coil. This results in certain fixed combinations of phase angle and amplitude and there is a possibility that the fixed phase angle amplitude relationships will not be optimum for maximum flaw sensitivity. To realize optimum flaw sensitivity it is desirable to adjust the phase and amplitude independently of each other rather than in an interdependent method as by removing turns from one coil.

Accordingly, the principal object of this invention is to provide a method and apparatus for adjusting the flaw sensitivity of an eddy current instrument that utilizes a pickup coil formed by a pair of coils coupled in electrical opposition.

A further object of this invention is to provide a method and apparatus for independently adjusting the phase and the amplitude of the signal from at least one of the coils of the pair of coils that form the pickup coil assembly of an eddy current instrument.

A still further object of this invention is to provide a method and apparatus for independently adjusting the phase and amplitude of the signal from at least one coil of a pair of coils that form the pickup coil assembly of an eddy current instrument. The signal from the one coil is then combined with the signal from the other coil in electrical opposition to provide a single signal whose phase may be related to the phase of the power supply coupled to the source coil of the eddy current instrument.

The above objects and advantages of this invention are achieved by coupling to an amplifying means at least one of the coils of the pair of coils that form the pickup coil assembly. The amplifying means in turn is coupled to a means for independently adjusting the amplitude of the coil signal. The amplitude adjusting means is then coupled to a means for adjusting the phase of the signal. Finally, the signal from the first coil and signal from the second coil are coupled to a differential amplifier that provides a single output signal that is the vectorial sum of the two input signals.

Figure 2:
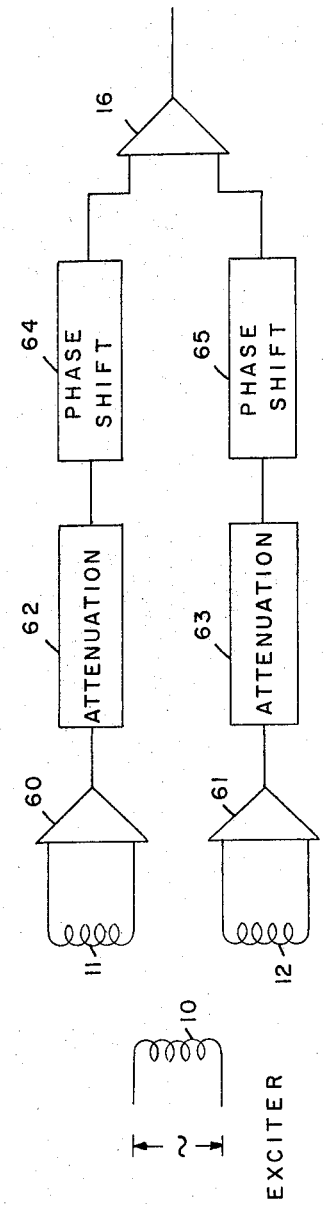

The above objects and advantages of this invention will be more easily understood from the following detailed description when taken in conjunction with the attached drawings in which:

FIGURE 1 is a schematic circuit for performing the method of this invention; and FIGURE 2 shows in block diagram form a second embodiment of this invention.

The term "eddy current instrument" as used in describing this invention refers to an instrument in which a source coil is coupled to an alternating current power supply to induce an alternating magnetic field in a metallic member. The alternating magnetic field will cause eddy currents to flow in the metallic member and any anomaly or other flaw in the metallic member will disrupt this flow of eddy currents. This disruption in the flow of the eddy currents can be detected by a second coil that is placed within the eddy current field. The signal induced in the second coil can be supplied to a phase comparison means in which the phase of the signal in the second coil can be compared with the phase of the power supply connected to the source coil. Similarly, one may use amplitude detection in which one detects the amplitude of the signal induced in the second or pickup coil. The above-referenced copending application is directed to an improved form of the eddy current type instrument in which the pickup coil is disposed a distance at least equal to the diameter of the metallic member from the source coil. In addition, the pickup coil is formed from two coils that are connected to each other in electrical opposition. Finally, the instrument disclosed utilizes the phase detecting technique to provide a very sensitive instrument. This result can only be achieved if the signal from the two coils have nearly, but not necessarily the exact amplitude and phase. In general, maximum flaw sensitivity is realized if the signals are 180° out of phase and not quite of the same amplitude so that there is still a net resultant whose phase with respect to the power supply can be measured. To achieve this result as explained above, the copending application discloses a technique for removing windings of one coil in order to balance it with respect to the other coil. This technique of removing turns has been referred to as adjusting the flaw sensitivity of the instrument.

Referring now to the attached drawing, there is shown an apparatus capable of adjusting the sensitivity of the type of instrument described in copending application. In the attached drawing, the coil 10 is the source or exciter coil for the eddy current instrument while the coils 11 and 12 are the two coils that form the pickup coil assembly of the instrument. The coil 11 is coupled to an attenuating means 14 by means of an amplifying stage 13. Attenuating means 14 is coupled to a phase adjusting means 15. The phase adjusting means 15 and the coil 12 are coupled to a difference amplifier 16 whose output signal is the vectorial difference between the adjusted signal from coil 11 and the signal from coil 12.

The coil 11 is coupled to the base of transistor 20 that forms a single stage amplifier 13. The base of the transistor 20 is coupled to the B— power supply through a resistance 21 while the emitter is coupled to the ground 17 through a parallel resistance capacitance 23. The signal appearing on the collector of the transistor 20 is coupled to the primary of the transformer 25 through a capacitance 27 and a potentiometer 24. The potentiometer 24 provides a means for adjusting the amplitude of the signal from the amplifying stage 13.

The secondary of the transformer 25 is coupled to the field coil 26 of the magnetic resolver that forms the phase adjusting circuit 15. The two rotor coils 30 and 31 of the magnetic resolver are coupled to a series resistance capacitance network formed by a resistance 32 and capacitance 33. While a magnetic resolver is shown in the enclosed drawing as a phase adjusting means other circuits could be substituted, for example sine-cosine potentiometers could be used to perform this function. Similarly, the functions could be performed by various electronic circuits. The point between the resistance 32 and the capacitance 33 is coupled by capacitor 35 to the base of a transistor 36 with the transistor 36 forming one-half of the difference amplifier 16. The base of the transistor 36 is coupled to the B— power supply through a resistance 40 and to ground 17 through a resistance 41. Similarly, the emitter is connected to ground through a resistance 42 while the collector is connected to the B— power supply through a resistance 43. The signal from the amplifier is taken off at the lead 50. The other half of the difference amplifier 16 is formed by a transistor 44 whose base is coupled to the coil 12 by means of a lead 45 having a capacitor 46 disposed therein. The emitter and collector of the transistor 44 are coupled to ground and to the B— power supply in the same manner as the emitter and collector of the transistor 36. The various resistors and capacitance of the difference amplifier 16 should have substantially the same value in order that the circuit 16 will be capable of providing the vectorial difference between the two input signals. The output signal from the difference amplifier 16 appears on the leads 50 and 51 and is equal to the vectorial difference between the two signals applied to the bases of the two transistors 36 and 44.

The circuit described above is operated by coupling the exciter coil 10 to a source of alternating voltage not shown. In the copending application this source is indicated as being a 60-cycle source. When the instrument is placed in close proximity to a metallic member a signal will be induced in each of the pickup coils 11 and 12 due to the eddy currents flowing in the metallic member. The signal in the pickup coil 12 will be supplied directly to one-half of the difference amplifier 16 while the signal in the pickup coil 11 will be modified by the circuit described above. The signal in the coil 11 will first be amplified to insure that its amplitude excess the amplitude of the signal induced in the pickup coil 12. The amplitude will then be adjusted by means of the potentiometer 24 until it is nearly equal to the amplitude of the signal of the pickup coil 12. The phase of the signal will then be adjusted by the phase adjusting circuit 15 without altering the amplitude. The phase of the signal should be adjusted so that it is approximately 180 degrees out of phase with the signal of the pickup coil 12. Finally, the signal will be applied to the transistor 36 forming the other half of the difference amplifier 16. The difference amplifier 16 will then vectorially combine the signals from the pickup coils 11 and 12 and supply an output signal equal to the vectorial difference between these two signals.

To adjust the instrument described in the copending application that incorporates the apparatus of the present invention, the instrument is disposed adjacent a metallic member preferably in the interior of a tubular member that is relatively free of flaws and other anomalies. The signal from the pickup coil 11 is then adjusted until its amplitude is nearly equal to the amplitude of the signal from the pickup coil 12 and its phase is substantially 180 degrees out of phase with respect to the signal of the pickup coil 12. With these adjustments one should obtain a nearly zero output from the difference amplifier 16. It may be desirable in some cases to adjust the amplitude of the signal from the pickup coil 11 so that it slightly exceeds the amplitude of the pickup coil 12 in order to supply an output signal from the difference amplifier 16 in the absence of flaws and other anomalies.

While the invention has been described in the above circuit as providing an adjustment for the signal from only one of the coils forming the pickup coil in some cases it may be desirable to include an amplitude and phase adjustment for the signal from both coils. When this is desirable the circuit coupled between the pickup coil 11 and the difference amplifier 16 can be repeated for the pickup coil 12 as shown in FIGURE 2. The coil 11 is coupled to an amplifier 60, attenuating means 62 and phase shifting circuit 64 while the coil 12 is coupled to an amplifier 61, attenuating means 63 and phase shifting circuit 65. The attenuating means may utilize a resistance while the phase shifting means may be a vector resolver as shown in FIGURE 1. The separate adjustment of the pickup coil signals would be desirable where it is necessary to vary the sensitivity of the instrument for various materials that have various characteristics. Characteristics of various materials as explained above result in noisier signals from some members and quieter signals from other members. In addition to providing a circuit for each of the pickup coils 11 and 12 it may be desirable to couple the amplitude adjustment controls together so that they may be provided with a plurality of fixed positions that will permit an operator to select the sensitivity for the instrument for various members that are to be tested. Such sensitivity controls could also be made a separate control from the amplitude adjustment controls required to adjust the sensitivity of the pickup coils. In this way an operator could adjust the sensitivity of the instrument without changing the balance between the two coils 11 and 12.

I claim as my invention:

1. An apparatus for adjusting the flaw sensitivity of an eddy current instrument using a source coil and two pickup coils coupled in electrical opposition, said pickup coils being spaced from said source coil a distance at least equal to the diameter of the metallic member under test, said apparatus comprising:

a first circuit means coupled to one of the pickup coils, said circuit means including individually adjustable phase shifting and attenuating networks said phase shifting network in addition changing the phase of the pickup coil signal without changing its amplitude;

a second circuit means coupled to the other of said pickup coils;

a differential circuit means, said first and second circuit means being coupled to said differential circuit means to vectorially combine the signals of said first and second circuit means.

2. An apparatus for adjusting the flaw sensitivity of an eddy current instrument having a pair of pickup coils coupled in electrical opposition, said pickup coils being spaced from said source coil a distance at least equal to the diameter of the metallic member under test said apparatus comprising:

a first circuit including an amplifier, individually adjustable attenuating and phase shifting circuits, one of said pickup coils being coupled to said first circuit, said phase shifting circuit changing the phase of the pickup coil signal without changing its amplitude;

a second circuit including an amplifier and attenuating circuit, the other of said pickup coils being coupled to said second circuit;

a difference amplifier, said first and second circuits being coupled to said difference amplifier.

3. An apparatus for adjusting the flaw sensitivity of an eddy current instrument using a source coil and two pickup coils coupled in electrical opposition, said pickup coils being spaced from said source coil a distance at least equal to the diameter of the metallic member under test said apparatus comprising:

a first amplifying means including means for adjusting the amplitude of the output signal of said amplifying means, one of said pickup coils being coupled to said amplifying means;

a separate phase adjusting circuit for changing the phase of a signal without changing the amplitude of the signal, said amplifying means being coupled to said phase adjusting circuit;

a difference amplifier, said phase adjusting circuit and the other pickup coil being coupled to said difference amplifier to vectorially combine the signals of said phase adjusting circuit and said other pickup coil.

References Cited by the Examiner

UNITED STATES PATENTS

| 2,135,675 | 11/1938 | Palmer | 324—40 |
| 2,827,787 | 3/1958 | Kroeger | 340—199 |
| 2,989,693 | 6/1961 | Foerster | 324—40 |
| 3,020,472 | 2/1962 | Cauley | 324—40 |
| 3,146,395 | 8/1964 | Quittner | 324—40 |

WALTER L. CARLSON, *Primary Examiner.*

RICHARD B. WILKINSON, *Examiner.*

F. A. SEEMAR, R. J. CORCORAN, *Assistant Examiners.*